(12) United States Patent
Wohlford

(10) Patent No.: US 7,975,976 B2
(45) Date of Patent: Jul. 12, 2011

(54) IN-WALL INTERFACE AND MOUNTING METHOD FOR DISPLAY MOUNT

(75) Inventor: Jim Wohlford, Edina, MN (US)

(73) Assignee: Milestone AV Technologies LLC, Savage, MN (US)

( * ) Notice: Subject to any disclaimer, the term of this patent is extended or adjusted under 35 U.S.C. 154(b) by 534 days.

(21) Appl. No.: 11/846,835

(22) Filed: Aug. 29, 2007

(65) Prior Publication Data

US 2008/0054144 A1    Mar. 6, 2008

Related U.S. Application Data

(60) Provisional application No. 60/823,896, filed on Aug. 29, 2006.

(51) Int. Cl.
*F16M 11/00* (2006.01)

(52) U.S. Cl. ..... 248/282.1; 248/919; 52/27; 361/679.06

(58) Field of Classification Search ........... 52/27, 741.1, 52/220.1, 220.7; 174/58, 61, 63, 64; 248/231.9, 248/231.91, 917, 919, 920, 921, 922, 906, 248/282.1; 361/679.01, 679.02, 679.05, 361/679.06; 348/836, 843
See application file for complete search history.

(56) References Cited

U.S. PATENT DOCUMENTS

| | | | |
|---|---|---|---|
| 1,748,234 A * | 2/1930 | Loeb | 220/3.4 |
| 2,666,546 A * | 1/1954 | Reilly | 220/3.4 |
| 2,878,955 A * | 3/1959 | Hagan | 220/3.9 |
| 4,613,728 A * | 9/1986 | Lathrop | 174/53 |
| 4,642,418 A * | 2/1987 | Menchetti | 174/503 |
| 4,758,687 A * | 7/1988 | Lathrop | 174/53 |
| 5,145,136 A | 9/1992 | McConnell | |
| D437,772 S | 2/2001 | Erwin | |
| 6,186,460 B1 | 2/2001 | Lin | |
| 6,360,842 B1 * | 3/2002 | Combest | 181/150 |
| 6,415,886 B1 * | 7/2002 | Combest | 181/150 |
| 6,437,241 B1 * | 8/2002 | Neujahr | 174/58 |
| 6,752,363 B2 | 6/2004 | Boele | |
| D493,900 S | 8/2004 | Pfister et al. | |
| D494,978 S | 8/2004 | Pfister | |
| D495,713 S | 9/2004 | Pfister et al. | |
| D495,714 S | 9/2004 | Pfister | |
| D496,367 S | 9/2004 | Pfister | |
| 6,802,575 B1 * | 10/2004 | Lee | 312/7.2 |
| 6,905,101 B1 * | 6/2005 | Dittmer | 248/274.1 |
| D507,477 S | 7/2005 | Pfister | |

(Continued)

FOREIGN PATENT DOCUMENTS

KR    100464265    *    1/2005
WO    WO 2005120053 A1 *    12/2005

OTHER PUBLICATIONS

U.S. Appl. No. 60/883,652, filed Jan. 5, 2007, Dittmer.

(Continued)

*Primary Examiner* — B. Glessner
*Assistant Examiner* — Jessie Fonseca
(74) *Attorney, Agent, or Firm* — Patterson Thuente Christensen Pedersen, P.A.

(57) ABSTRACT

A recessed in-wall interface box assembly that is relatively easy to install in a finished wall, including accommodations for video and electrical wiring in the box, having an attractive appearance, and that is relatively simple and inexpensive to manufacture.

19 Claims, 6 Drawing Sheets

U.S. PATENT DOCUMENTS

| | | |
|---|---|---|
| 7,028,961 B1 | 4/2006 | Dittmer et al. |
| D523,734 S | 6/2006 | Calaicone |
| D561,561 S | 2/2008 | Wohlford |
| 2002/0033436 A1 | 3/2002 | Peng et al. |
| 2003/0057340 A1* | 3/2003 | Mann et al. ................. 248/274.1 |
| 2004/0065032 A1* | 4/2004 | Commins .................... 52/293.3 |
| 2007/0158515 A1* | 7/2007 | Dittmer et al. ............. 248/283.1 |

OTHER PUBLICATIONS

CHIEF, Large Flat Panel In-Wall Accessory, *Chief Full Line Catalog*, Jun. 2006, pp. 43.

Office Action Search Report in Related Chinese Application Serial No. 200710181104, dated May 25, 2010.

* cited by examiner

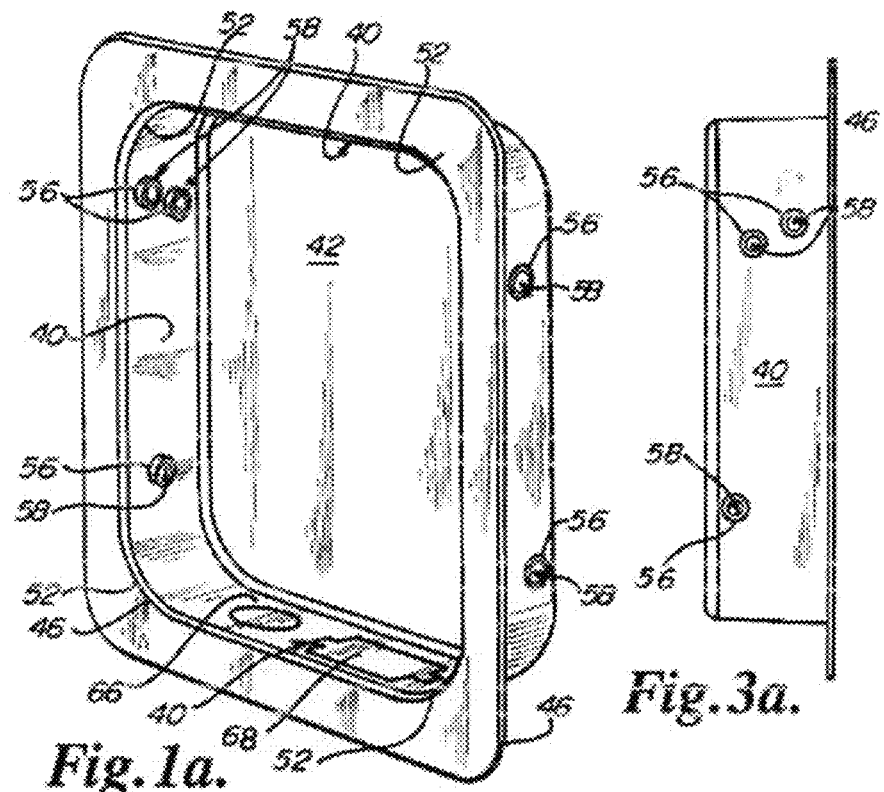
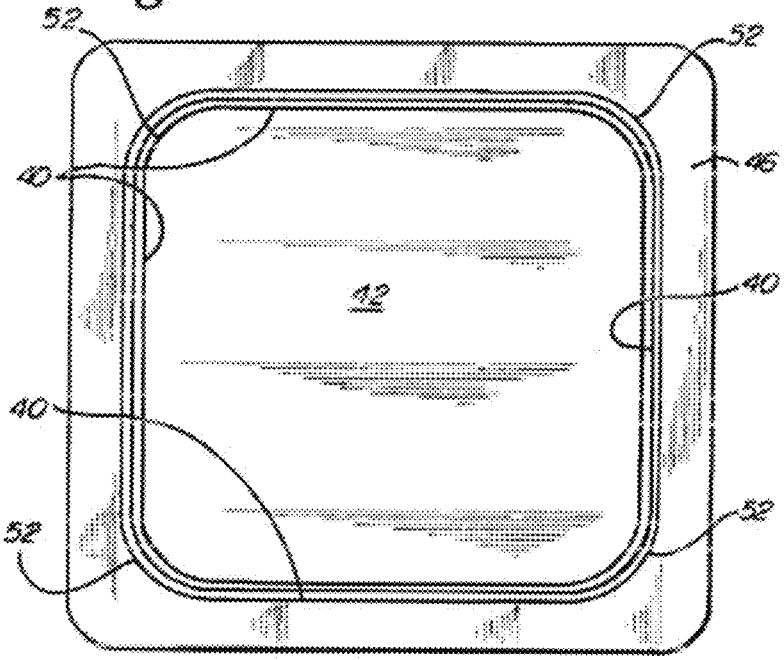
Fig. 1a.
Fig. 3a.
Fig. 2a.

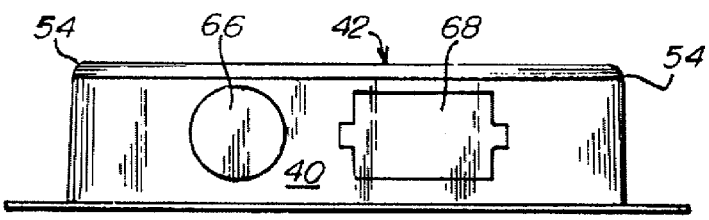
Fig.4a.
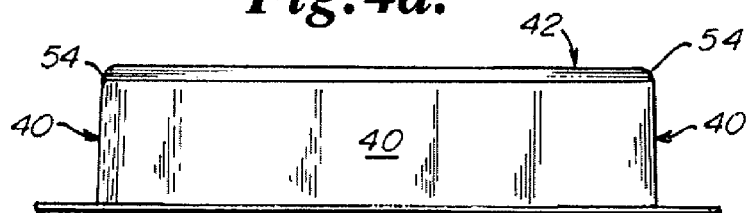
Fig.5a.
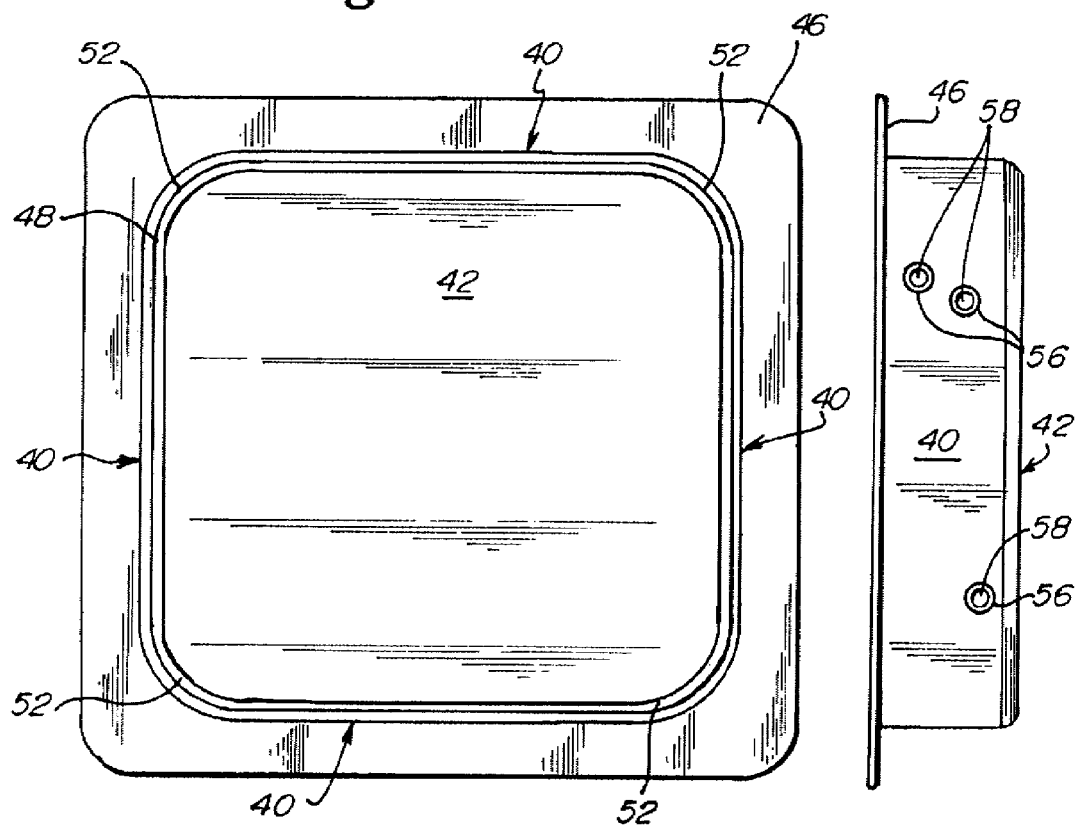
Fig.6a.          Fig.7a.

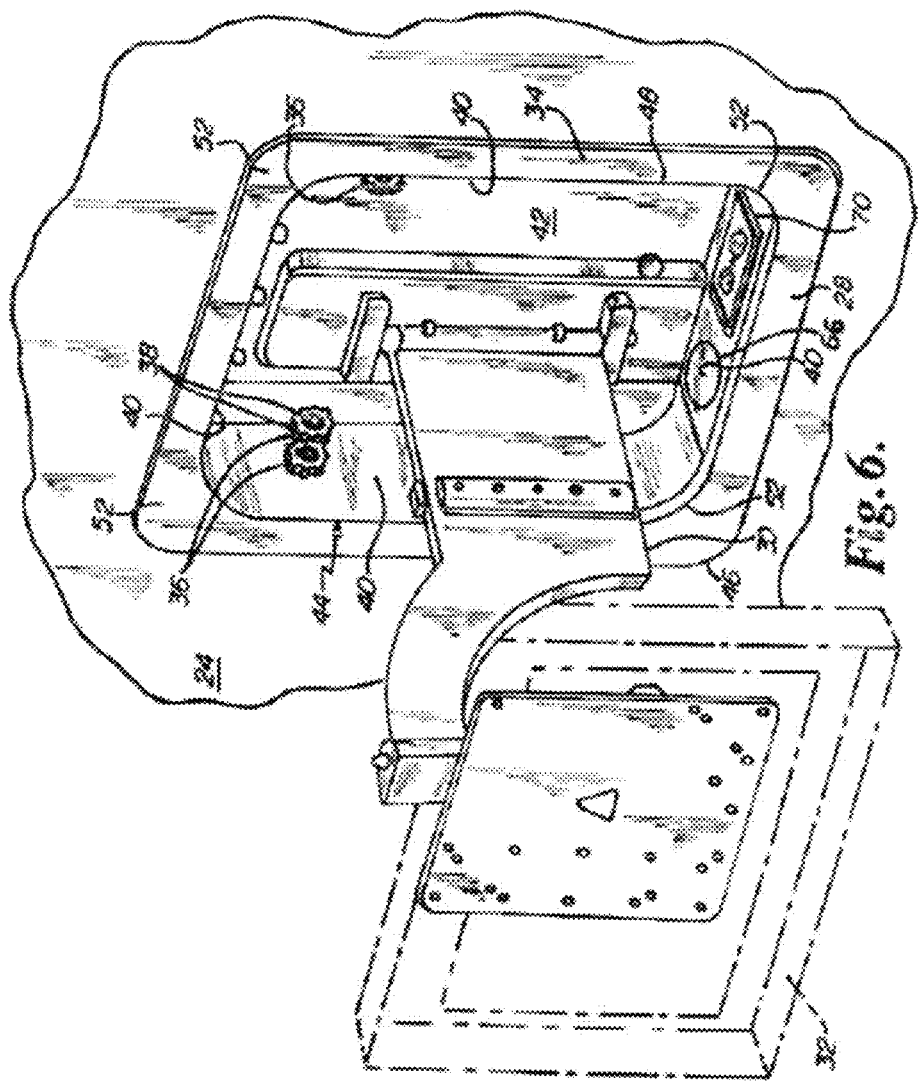

IN-WALL INTERFACE AND MOUNTING METHOD FOR DISPLAY MOUNT

RELATED APPLICATIONS

This application claims the benefit of U.S. Provisional patent application 60/823,896, filed Aug. 29, 2006, entitled IN-WALL INTERFACE AND MOUNTING METHOD FOR DISPLAY MOUNT. The above referenced application is incorporated herein by its entirety by reference.

FIELD OF THE INVENTION

The present invention relates to video displays and more specifically to mounting devices for video displays.

BACKGROUND OF THE INVENTION

Flat panel monitors and televisions are becoming ever-more popular in homes and in commercial settings. Previously common Cathode-Ray Tube ("CRT") monitors are being replaced by flat panel devices at a rapid rate. A chief advantage of flat panel devices over CRTs is the appealing aesthetic of a very shallow device that resembles a framed photo or painting when mounted on a wall.

Many different configurations of wall mounting devices have been developed for flat panel displays. Examples of such prior mounting devices are disclosed in U.S. Pat. Nos. 7,028,961; 6,905,101; D507,477; D496,367; D495,714; D495,713; D494,978; D494,596; D493,800; and U.S. Patent Publication No. 20070158515 all hereby incorporated herein by reference. Although these prior mounting devices contribute to providing a shallow frame aesthetic for the wall mounted flat panel monitor, some clearance between the back of the monitor and the plane of the wall is generally needed with these prior art mounts in order to provide space for the mount itself and to allow for positioning of the monitor.

In-wall recessed boxes have been previously used with a flat panel monitor and mounting device to enable the back plane of the monitor to be positioned closer to the plane of the wall on which it is mounted. In these devices, the box is installed in the wall to define a recess and a mounting device, such as those referenced above, is mounted in the recess. These previous in-wall boxes, however, have had some drawbacks. One drawback of previous in-wall boxes is that they are generally difficult to install in an existing finished wall, requiring extensive portions of the wall inner envelope layer (i.e. sheetrock or plaster) to be removed to facilitate access for fastening the box to structural frame members (i.e. studs). Due to variations in the spacing of studs, specialized shims are often needed to enable positioning of the in-wall box at a desired location in the wall. Another installation related drawback to prior in-wall mounting devices is that no provision is typically made to accommodate electrical and video wiring within the box. Separate outlet boxes must be provided in the wall adjacent the in-wall mounting box or holes must be drilled in the box for the wires to be accommodated. Also, the appearance of prior boxes has typically been somewhat crude, having a generally "industrial" character. Finally, the boxes themselves have typically been expensive to manufacture.

What is still needed in the industry is an in-wall interface in the form of a recessed in-wall box that is relatively easy to install in a finished wall, has accommodations for video and electrical wiring in the box, has an attractive appearance, and that is relatively simple and inexpensive to manufacture.

SUMMARY OF THE INVENTION

The present invention addresses the need in the industry by providing a recessed in-wall box that is relatively easy to install in a finished wall, has accommodations for video and electrical wiring in the box, has an attractive appearance, and is relatively simple and inexpensive to manufacture.

An embodiment of the present invention generally includes an in-wall interface for a display mount that includes a body pan defining a recess for receiving a display mount for flat panel display devices. The body pan is sized for positioning between a pair of frame members of a wall structure. The interface also includes at least one shimming mechanism operatively coupled with the body pan, the shimming mechanism being selectively shiftable to engage the frame members and retain the body pan in a desired position. Further, the shimming mechanism includes at least one fastener for permanently affixing the in-wall box to the frame member.

Additionally, another embodiment of the present invention includes an in-wall interface for a display mount. The interface includes a body pan defining a recess for receiving a display mount for flat panel display devices. The body pan is sized for positioning between frame members of a wall structure. Also, found in some embodiments are multiple threaded bosses defined in the body pan walls at locations in the same proximity as the frame members. Further, a plurality of externally threaded shimming thumb-screws may be included. These thumb-screws are capable of engagement through the threaded bosses for adjustable support of the body pan between the structural frame members. The shimming thumb-screws each contain an axially disposed bore. A plurality of fasteners are provided for driving through the bores of the shimming thumb-screws and into the structural frame members to fixedly support the body pan.

A further embodiment of the present invention includes a method of installing a flat panel display mount. The front panel display is installed using this method by first providing an in-wall interface member defining a recessed portion for receiving a display mount and accommodating video and electrical wiring. A hole is defined in a membrane assembly of a wall roughly corresponding to the shape of the periphery of the in-wall interface member. Shimming thumb-screws are threaded through bosses in the in-wall interface until the distal end of each thumb-screw engages a frame member in the wall.

Some additional embodiments provide an in-wall interface system for mounting an electronic display including a body pan that defines a recess for receiving a display mount for flat panel display devices. The body pan is sized for positioning between a pair of frame members of a wall structure. The interface system also includes at least one means for shimming operatively coupled with the body pan. The shimming means is selectively shiftable so that it engages a surface of the frame members to retain the body pan in a desired position. Also included in the shimming means is at least one fastening means.

An embodiment of the present invention includes an in-wall interface system for mounting an electronic display. This embodiment includes a system including a body pan defining a recess for receiving a display mount for flat panel display devices. The body pan is sized for positioning between a pair of frame members of a wall structure and includes opposing walls providing a plurality of externally threaded bosses. There is also at least one shimming mechanism operatively coupled with the body pan. The shimming mechanism is selectively shiftable within the bosses to engage the frame members to retain the body pan in a desired position. Also, the shimming mechanism includes at least one fastener.

An advantage of certain embodiments to provide an in-wall interface which may be installed without requiring excessive removal of sheetrock or other inner wall envelope layer.

An advantage of certain embodiments is to provide an in-wall interface which is relatively easy to install and which does not require use of additional specialized shims.

It is also an advantage of certain embodiments to accommodate electrical and video wiring within an interface box as well as to eliminate the need for separate adjacent outlet boxes.

An advantage of certain embodiments is to provide an in-wall interface system for mounting an electronic display which has an attractive and aesthetically pleasing appearance, yet which is inexpensive to manufacture.

Further objects and advantages of particular embodiments of the present invention may become apparent to those skilled in the art upon review of the figures and descriptions of the present invention herein.

BRIEF DESCRIPTION OF THE FIGURES

The invention may be more completely understood in consideration of the following detailed description of various embodiments of the invention in connection with the following drawings, in which:

FIG. 6 is a perspective view of an installed in-wall box depicted with the display mounting device in place and coupled with a flat panel electronic display;

FIG. 1a is a front perspective view of the body pan of an in-wall box according to an embodiment of the invention;

FIG. 2a is a front elevation view of the body pan depicted in FIG. 1a;

FIG. 3a is a first side elevation view of the body pan depicted in FIG. 1a;

FIG. 4a is a bottom plan view of the body pan depicted in FIG. 1a;

FIG. 5a is a top plan view of the body pan depicted in FIG. 1a;

FIG. 6a is a rear elevation view of the body pan depicted in FIG. 1a; and

FIG. 7a is an opposing side elevation view of the body pan depicted in FIG. 1a.

Figure 1:
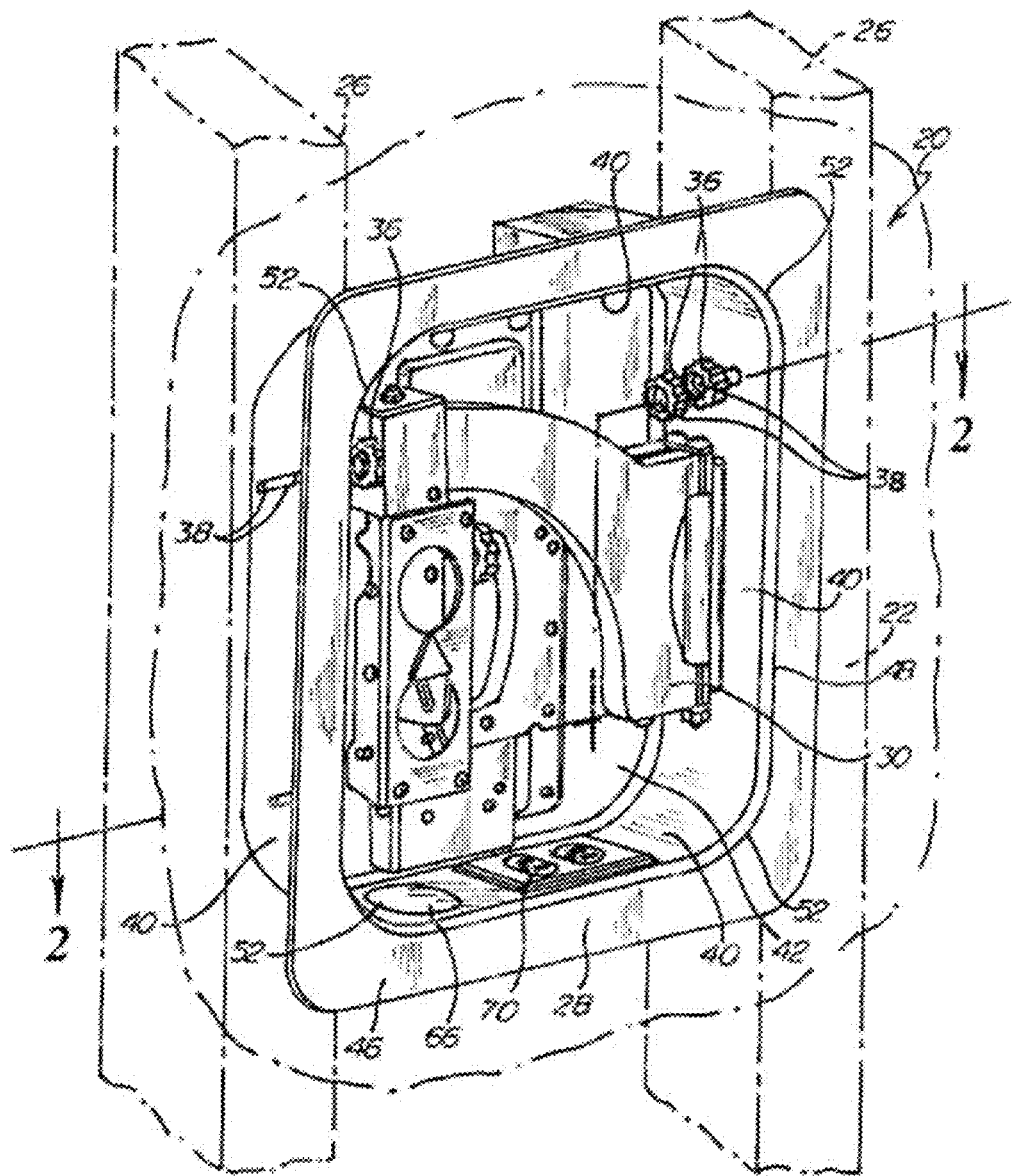
FIG. 1 is a front perspective view of an in-wall box according to an embodiment of the present invention, depicted in a frame wall.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

There is generally depicted in FIGS. 1-7a an in-wall interface for flat panel display and mounting system 20 in a wall structure 22, that includes a membrane assembly 24, for example sheetrock or plaster, and frame members 26, which may be wood studs. Such wall structures 22 having spaced-apart parallel frame members 26 are typical in most residential and commercial buildings. Mounting system 20 generally includes in-wall interface 28, which receives display mount 30 and attached flat panel display device 32.

In-wall interface 28 generally includes body pan 34, shimming mechanisms in the form of shimming thumb-screws 36, and threaded fasteners 38. Body pan 34 has walls 40 and back 42 defining recess 44. The depth of recess 44 and back 42 are sized such that the body pan will conveniently reside within the space between the membrane assembly 24 and any interior walls or structures. Peripheral flange 46 may extend outward around periphery 48 of recess 44, to enable hiding of wall membrane edges 50 for a finished appearance when installed in the wall structure 22. The peripheral flange 46 may have outer rounded corners and extend away from the periphery 48 in all directions. Body pan 34 may be molded from polymer in a single, integral piece or may be made from any other suitable material such as metal. Rounded corners 52 and 54 may be provided for a pleasing aesthetic appearance and to facilitate molding from the polymer material. Further, such contoured features can aid in minimizing entanglement of cords and avoid damage caused by sharp edges or corners.

Bosses 56 are provided in various locations in the walls 40 to allow convenient and beneficial adjustment locations for supporting and aligning the body pan 34 with the surrounding frame members. The bosses are generally part of the body pan 34. Typically, the boss locations are as shown in the figures, where pairs of bosses are transversely located in parallel walls across the recess of body pan 34 in axial alignment with one another. Further, the plurality of bosses 56 are spaced at varied distances from the periphery 48 of the body pan on the walls 40 to provide a greater range of potential adjustments for aligning or spacing the body pan 34 with respect to the frame members 26. Also, such spacing distributes stresses across the frame members 26 and allows for enhanced stability and desirable interface weight distribution. Although bosses 56 are typically located in the two side walls 40 of the body pan 34 that run parallel to vertically extending frame members 26, it is also contemplated that bosses 56 may be located in other walls 40 when frame members are adjacently disposed and therefore allow for this possibility.

Figure 2:
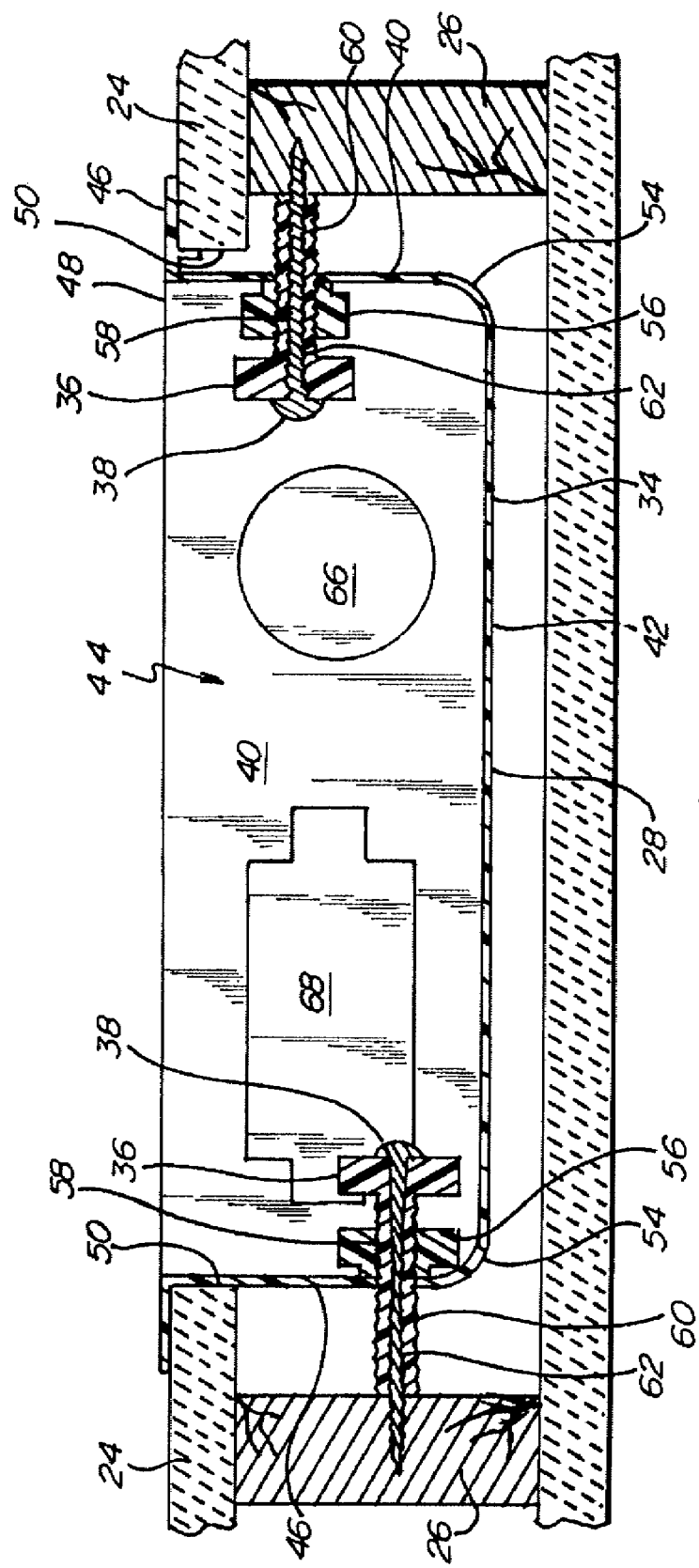
FIG. 2 is a cross-sectional view of the in-wall box of FIG. 1 taken at section 2-2 of FIG. 1.
Figure 5:
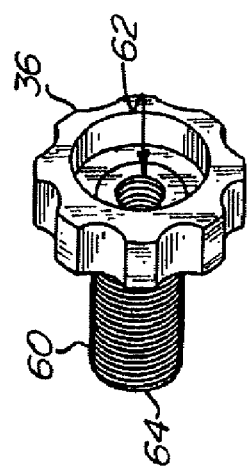
FIG. 5 is a perspective view of the shimming thumb-screw of FIGS. 3 and 4.
Figure 4:
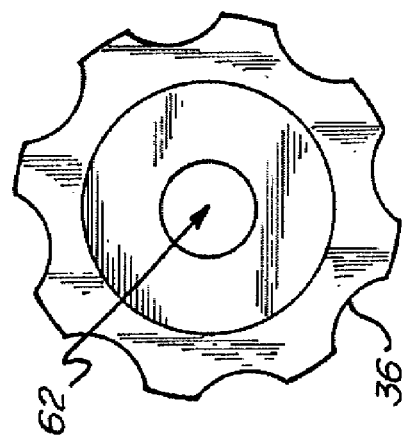
FIG. 4 is an end view of the shimming thumb-screw of FIG. 3.
Figure 3:
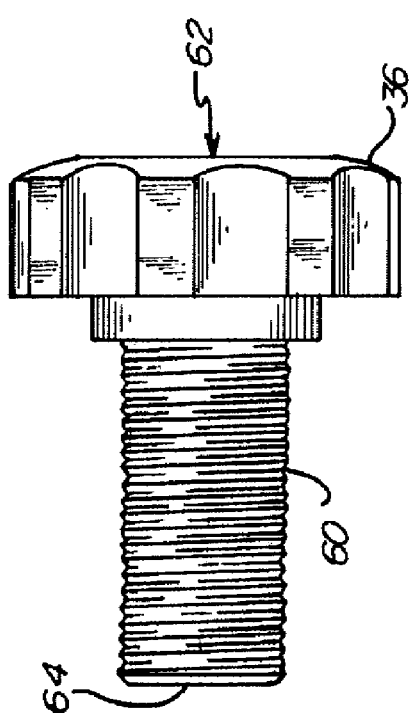
FIG. 3 is a phantom view of a shimming thumb-screw for use in the in-wall box of the present invention.

The bosses 56 are provided in walls 40, each defining a threaded bore 58 for receiving one of shimming thumb-screws 36, each of which has cooperating exterior threading 60. Each of the shimming thumb-screws 36 are thereby enabled to be threaded in and out of bores 50. Each shimming thumb-screw 36 defines an axially aligned bore 62 for receiving a fastener 38. Such fasteners 38 have a length greater than that of the corresponding shimming thumb-screws 36 so that the fasteners 38 may protrude from both ends of the shimming thumb-screws 36 when inserted in bore 50, as shown in FIG. 2. Bore 62 may or may not threadedly engage with fastener 38.

To install in-wall interface 28, a hole may be cut in membrane assembly 22, roughly corresponding with the size and shape of periphery 48. In-wall interface 28 is then placed in the hole, and each shimming thumb-screw 36 is threaded into one of the bosses 56 until distal end 64 engages the surface frame member 26. It will be appreciated that each shimming thumb-screw 36 may be separately adjusted to obtain the desired positioning of in-wall interface 28 within the hole, for example to adjust sideways positioning and to ensure that in-wall interface 28 is square with the floor ceiling or nearby wall edges. It will also be appreciated that in certain embodiments, the tip of thumb-screw 36 may be pointed so as to sink slightly into the surface of the frame member in order to provide greater purchase between the thumb screw and the frame member. Once shimming thumb-screws 36 are tightened in the desired position to temporarily hold the in-wall interface 28 in place, fasteners 38 are driven through bores 62 to secure in-wall interface 28 to the frame members 26.

In an embodiment of the invention, knockout portions 66, 68, may be provided in one or more of walls 40 to facilitate electrical connections, such as duplex outlet 70, thereby enabling a pleasing finished appearance to the electrical wiring installation for flat panel display 32. These knockout portions may, for example, be used to accommodate wiring for auxiliary components such as DVD players, receivers, speakers or other input or output devices.

It will be appreciated that, in alternative embodiments, shimming thumb-screws 36 may extend from only one of the walls 40, with the opposing wall 40 directly engaged with the adjacent frame member. In other embodiments, bosses 56 may be omitted and thumb-screws 36 threaded through apertures that are either pre-defined in body pan 34 or that are drilled in desired locations just before installation. In further embodiments, fasteners 38 may be separate from thumb-screws 36, with fasteners 38 being driven through separate apertures defined in walls 40.

What is provided then is an easy to install, discrete, and aesthetically pleasing in-wall interface for receiving and partially concealing a flat panel display mount in which accommodations for video and electric wiring are provided as well as sufficient space for flat panel monitor adjustment.

The embodiments above are intended to be illustrative and not limiting. Additional embodiments are encompassed within the scope of the claims. Although the present invention has been described with reference to particular embodiments, those skilled in the art will recognize that changes may be made in form and detail without departing from the spirit and scope of the invention. For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An in-wall interface system for mounting an electronic display to a wall structure, the system comprising:
   (a) a body pan having a plurality of spaced apart lateral walls and a back wall defining a recess, wherein the body pan is sized for positioning between a pair of frame members of the wall structure;
   (b) a plurality of threaded bosses integrally formed in the lateral walls; and
   (c) a plurality of externally threaded shimming thumb-screws, each of the shimming thumb-screws received in a separate one of the threaded bosses and selectively shiftable to engage the frame members and thereby temporarily support the body pan between the frame members, each of the shimming thumb-screws defining an axially disposed bore; and
   (d) a plurality of fasteners, each fastener for driving through a separate one of the bores of the shimming thumb-screws and into the frame members to fixedly secure the body pan to the frame members; and
   (e) a display mount in the recess of the body pan, the display mount adapted to receive the electronic display thereon, the display mount selectively shiftable between a first position wherein the display mount is substantially received in the recess to position the electronic display proximate the wall structure, and a second position wherein the display mount extends outward from the recess to position the electronic display away from the wall structure.

2. The in-wall interface system of claim 1 wherein each of the threaded shimming thumb screws is independently selectively shiftable.

3. The in-wall interface system of claim 1 wherein the frame members are vertically extending wood studs.

4. The in-wall interface system of claim 1 further including a knockout portion in at least one of the lateral walls.

5. The in-wall interface system of claim 1 further including a duplex outlet in one of the lateral walls.

6. The in-wall interface system of claim 1 wherein the fasteners are threadedly engaged with the bores of the shimming thumb-screws.

7. The in-wall interface system of claim 1 wherein the fasteners are not threadedly engaged with the bores of the shimming thumb-screws.

8. The in-wall interface system of claim 1 further including a peripheral flange extending outwardly from the body pan.

9. The in-wall interface system of claim 1 wherein the body pan is molded from polymer in a single integral piece.

10. The in-wall interface system of claim 1, wherein at least two of the threaded bosses are defined in the same lateral wall of the body pan, a first one of the two threaded bosses spaced forwardly a first distance from the back wall of the body pan, a second one of the two threaded bosses spaced apart a second distance from the back wall of the body pan, the second distance being greater than the first distance.

11. An in-wall interface system for mounting an electronic display to a wall structure, the system comprising:
   (a) a body pan having opposing spaced apart walls and a back wall defining a recess, the body pan dimensioned for positioning between a pair of frame members of the wall structure, at least one of the opposing walls defining a plurality of integrally formed threaded bosses;
   (b) a plurality of thumb-screws, each of the thumb-screws received in a separate one of the bosses and selectively shiftable relative to the body pan to engage the frame members, each of the thumb-screws defining an axial bore;
   (c) a plurality of fasteners, each of the fasteners received in a separate one of the axial bores of the thumb-screws, the fasteners selective shiftable relative to the thumb-screws and the body pan to fixedly attach the body pan to the frame members; and
   (d) a display mount in the recess, the display mount adapted to receive the electronic display thereon, the display mount selectively shiftable between a first position wherein the display mount is substantially received in the recess to position the electronic display proximate the wall structure, and a second position wherein the display mount extends outward from the recess to position the electronic display away from the wall structure.

12. The in-wall interface of claim 11 wherein each of the opposing walls defines at least one of the bosses.

13. The in-wall interface of claim 11 wherein an outer surface of the body pan is adapted to directly engage a surface of one of the frame members.

14. The in-wall interface of claim 11 wherein the shimming thumb-screws are independently shiftable.

15. The in-wall interface of claim 11 further including a duplex outlet in at least one of the body pan walls.

16. The in-wall interface system of claim 11, wherein at least two of the threaded bosses are defined in the same wall of the body pan, a first one of the two threaded bosses spaced forwardly a first distance from the back wall of the body pan, a second one of the two threaded bosses spaced apart a second distance from the back wall of the body pan, the second distance being greater than the first distance.

17. An electronic display system comprising:
a flat panel electronic display;
a display mount operably coupled to the flat panel display; and
an in-wall interface comprising:
  (a) a body pan having a pair of spaced apart lateral walls defining a recess, the display mount being received in the recess, wherein the body pan is sized for positioning between a pair of frame members of a wall structure;
  (b) a plurality of threaded bosses integrally formed in the lateral walls of the body pan;
  (c) a plurality of externally threaded shimming thumb-screws, each of the shimming thumb-screws received in a separate one of the threaded bosses and selectively shiftable to engage the frame members and thereby temporarily support the body pan between the frame members, each of the shimming thumb-screws defining an axially disposed bore; and
  (d) a plurality of fasteners, each fastener for driving through a separate one of the bores of the shimming thumb-screws and into the frame members to fixedly secure the body pan to the frame members.

18. The electronic display system of claim 17, wherein at least two of the threaded bosses are defined in the same lateral wall of the body pan, a first one of the two threaded bosses spaced forwardly a first distance from the back wall of the body pan, a second one of the two threaded bosses spaced apart a second distance from the back wall of the body pan, the second distance being greater than the first distance.

19. The electronic display system of claim 17, wherein the display mount is selectively shiftable between a first position wherein the display mount is substantially received in the recess to position the flat panel electronic display proximate the in-wall interface, and a second position wherein the display mount extends outward from the recess to position the flat panel electronic display away from the in-wall interface.

* * * * *